United States Patent
Hackborn et al.

(10) Patent No.: US 9,256,759 B1
(45) Date of Patent: Feb. 9, 2016

(54) COMPUTER APPLICATION PRE-PERMISSIONING

(75) Inventors: Dianne K. Hackborn, Mountain View, CA (US); David P. Bort, Palo Alto, CA (US); Joseph M. Onorato, Cambridge, MA (US); Daniel R. Bornstein, San Francisco, CA (US); Andrew T. McFadden, Sunnyvale, CA (US); Brian J. Swetland, Mountain View, CA (US); Richard G. Cannings, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 13/619,662

(22) Filed: Sep. 14, 2012

Related U.S. Application Data

(63) Continuation of application No. 13/248,959, filed on Sep. 29, 2011, now Pat. No. 8,332,936, which is a continuation of application No. 12/858,371, filed on Aug. 17, 2010, now Pat. No. 8,255,991.

(60) Provisional application No. 61/234,624, filed on Aug. 17, 2009.

(51) Int. Cl.
*H04L 29/06* (2006.01)
*G06F 21/62* (2013.01)
*G06F 21/31* (2013.01)
*G06F 7/04* (2006.01)
*G06F 12/00* (2006.01)
*G06F 12/14* (2006.01)
*G06F 13/00* (2006.01)
*G06F 17/30* (2006.01)

(52) U.S. Cl.
CPC ............ *G06F 21/6218* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 6,378,128 | B1* | 4/2002 | Edelstein et al. | 717/174 |
| 7,963,441 | B2* | 6/2011 | Emmons et al. | 235/383 |
| 8,255,991 | B1 | 8/2012 | Hackborn et al. | |
| 8,332,936 | B1 | 12/2012 | Hackborn et al. | |
| 2006/0059348 | A1* | 3/2006 | Girard et al. | 713/176 |
| 2006/0294105 | A1* | 12/2006 | Rosenan et al. | 707/9 |
| 2007/0124459 | A1* | 5/2007 | Kasama | 709/224 |
| 2007/0198834 | A1* | 8/2007 | Ksontini et al. | 713/168 |
| 2007/0294530 | A1* | 12/2007 | Zlotnick | 713/167 |
| 2008/0189793 | A1* | 8/2008 | Kirkup et al. | 726/27 |
| 2008/0244167 | A1* | 10/2008 | Tolmie | 711/104 |
| 2009/0328028 | A1* | 12/2009 | O'Rourke et al. | 717/173 |
| 2010/0088367 | A1* | 4/2010 | Brown et al. | 709/203 |
| 2010/0088696 | A1* | 4/2010 | Stoev et al. | 717/178 |
| 2010/0192144 | A1* | 7/2010 | Schmit | 717/173 |
| 2010/0250376 | A1* | 9/2010 | Nandiraju | 705/17 |
| 2010/0262619 | A1* | 10/2010 | Zargahi et al. | 707/770 |
| 2010/0299225 | A1* | 11/2010 | Aarni et al. | 705/27 |
| 2014/0082611 | A1* | 3/2014 | Li et al. | 717/178 |

\* cited by examiner

*Primary Examiner* — Shin-Hon Chen
(74) *Attorney, Agent, or Firm* — Fish & Richardson P.C.

(57) ABSTRACT

A computer-implemented method of pre-permissioning a computer application is disclosed. The method includes receiving a request from a user to install a software application, identifying one or more computing services required for operation of the software application, presenting the one or more computing services to the user for review, determining whether the user approves installation of the computer application, and installing the application on a computing device assigned to the user if the user approves installation of the computer application.

14 Claims, 8 Drawing Sheets

Application : Bob's Big Application
Identified Permissions

| | Mandatory | Optional | What Users Lose |
|---|---|---|---|
| Network Communication | ● | ○ | |
| Phone State | ● | ○ | |
| Read Contacts | ● | ○ | |
| Write Contacts | ○ | ● | You cannot easily save notes that your contacts squirt to you. |
| Friend Locations | ○ | ● | You won't be able to geo-coordinate squirts from your friends |
| Read Friends Info | ● | ○ | |

FIG. 4A

COMPUTER APPLICATION PRE-PERMISSIONING

CROSS-REFERENCE TO RELATED APPLICATIONS

This application is a continuation of and claims priority under 35 U.S.C. §120 to U.S. patent application Ser. No. 13/248,959, filed Sep. 29, 2011, which is a continuation of and claims priority to U.S. patent application Ser. No. 12/858,371, filed Aug. 17, 2010, (now U.S. Pat. No. 8,255,991) which claims priority to U.S. Provisional Application Ser. No. 61/234,624, filed on Aug. 17, 2009, entitled "Computer Application Pre-Permissioning," the entire contents of which are hereby incorporated by reference.

TECHNICAL FIELD

This document relates to systems and techniques for assigning permissions to applications on a computing device, such as by notifying a user of possible permissions at the time an application is installed, and operating the application according to permissions selected by the user at that time.

BACKGROUND

Computer viruses and other nefarious programs can be a real annoyance for computer users. For example, viruses can send annoying marketing messages to a user, or can enroll the user's computer in a botnet that employs the computer for improper uses such as distributed denial of service attacks. Bad programs can be more than annoying when they are able to access confidential information from a user's computer. For example, a program might intercept credit card information or other user data, and a syndicate that distributes the program may use such information for purposes of identity theft or other such purposes.

To prevent such problems, a computer operating system may request permissions from a user each time an application is run and attempts to access particular computing resources. For example, the operating system may stop the execution of a program, and may display a warning box to a user. The operating system may prevent further execution of the program, or access by the program to the user's data, until the user has explicitly indicated that the program can have such access. Such constant interruption by an operating system may itself be a real annoyance for the computer user.

SUMMARY

This document describes systems and techniques for controlling access by computer applications to computer services and other resources. Such control may be implemented at install-time, when a user is initially downloading and installing an application, such as an application that the user is in the process of buying from an application store, or app store, that vends applications, such as to users of smart phones, netbooks, and similar computing devices. Thus, when a user expresses interest in an application and starts an install process, the user may be presented with a list or similar presentation of all the services that the application will need to access in order to run properly on the user's device. The user can then decide whether to continue the installation process if they are comfortable with the application accessing such services (e.g., if the application is from a very trusted provider and/or the application does not seek to access particularly confidential or otherwise sensitive information.

The user can also be given the opportunity to define a permissions profile for an application, where the user can grant access to certain services that the application needs in order to operate to its maximum effectiveness, and can deny access to other services. The application developer may define certain permissions as being critical to the operation of their application, so that if a user does not want to provide a permission for such access, then the application will not be installed for the user. Other permissions may be optional so that a user can choose to have his or her device block them, and a system may explain to the user at the time of installation what functionality they will lose in the program by blocking such permissions.

In one implementation, a computer-implemented method of pre-permissioning a computer application is disclosed. The method comprises receiving a request from a user to install a software application, identifying one or more computing services required for operation of the software application, presenting the one or more computing services to the user for review, determining whether the user approves installation of the computer application, and installing the application on a computing device assigned to the user if the user approves installation of the computer application. The method can further comprise receiving from the user an indication of one or more of the computing services for which the application is to have access, and installing the application on the computing device to have access only to the computing services indicated by the user. In addition, the method can comprise indicating to the user a mandatory or optional status for each of the one or more computing services, and providing an option for the user to choose to select each computing service having an optional status.

In some aspects, the method further comprises providing, for display to the user, a description of functionality provided by one or more computing services having an optional status. The method can also include subsequently receiving from the user an indication of an intent to change permissions for the application, presenting the one or more computing services to the user for review, and updating permissions for the application based on selections made by the user in response to be presented with the one or more computing services. Receiving the request from the user to install the software application can also comprise receiving a user request directed to an on-line application store, and wherein the application is installed from the on-line application store. In addition, a first of the one or more computing services may comprise writing to a particular data set, and a second of the one or more computing services comprises reading from the particular data set.

In yet other aspects, writing to the particular data set is an optional computing service that need not be available to the user in order to operate the application. The method can also include executing the computer application and blocking access to at least one of the computing services. Moreover, the at least one of the computing services can include a computing service that the user selected to be inaccessible to the computer application at the time of installing the application. And the method can further comprise prompting the user, at the time of executing the computer application, to determine whether the user would like to access the at least one computing service.

In another implementation, a computer-implemented system for pre-permissioning a computer application is disclosed. The system comprises one or more applications on a computing device, the one or more applications operable to use a plurality of computing services that are accessible by the computing device, one or more permission records stored on the computing device and identifying first sets of computing services, from the plurality of computing services, that a user of the computing device has selected to be accessible by the one or more applications, and an operating system controlling operation of the device and accessing the permission record to control access by the applications to the computing services. The system can also include an interface programmed to interact with a user in changing the one or more permission records to modify the plurality of computing services that are accessible by the one or more applications. Moreover, the system can comprise an app store application configured to set permissions to access the plurality of computing services for applications downloaded to the computing device from an app store, at the time of installation of the applications on the computing device.

In certain aspects, the app store application is programmed to permit a user of the computing device to select a subset of computing services from a list of the computing services that an application is to have access to. Also, the operating system can comprise an access controller programmed to read the permission records and to permit access by a first application to a computing service only if the permission records indicate that the first application should have access to the computing service.

In yet another implementation, a computer-implemented system for pre-permissioning a computer application comprises one or more applications on a computing device, the one or more applications operable to use a plurality of computing services that are accessible by the computing device, one or more permission records stored on the computing device and identifying first sets of computing services, from the plurality of computing services, that a user of the computing device has selected to be accessible by the one or more applications, and means for mediating access to the computing services using the permission records.

The details of one or more embodiments are set forth in the accompanying drawings and the description below. Other features and advantages will be apparent from the description and drawings, and from the claims.

DESCRIPTION OF DRAWINGS

FIG. 4A is a screen shot of a display for receiving permissioning information for an uploaded computer application.

Like reference symbols in the various drawings indicate like elements.

DETAILED DESCRIPTION

This document describes systems and techniques for providing a mechanism by which a user of a computing device may grant permissions, such as permissions to access certain services or data available from the device, to particular applications. Using such a feature, the user may better maintain control of the information that each application may access, and the sorts of things that each application can do to the device (such as by overwriting data on the device).

Figure 1:
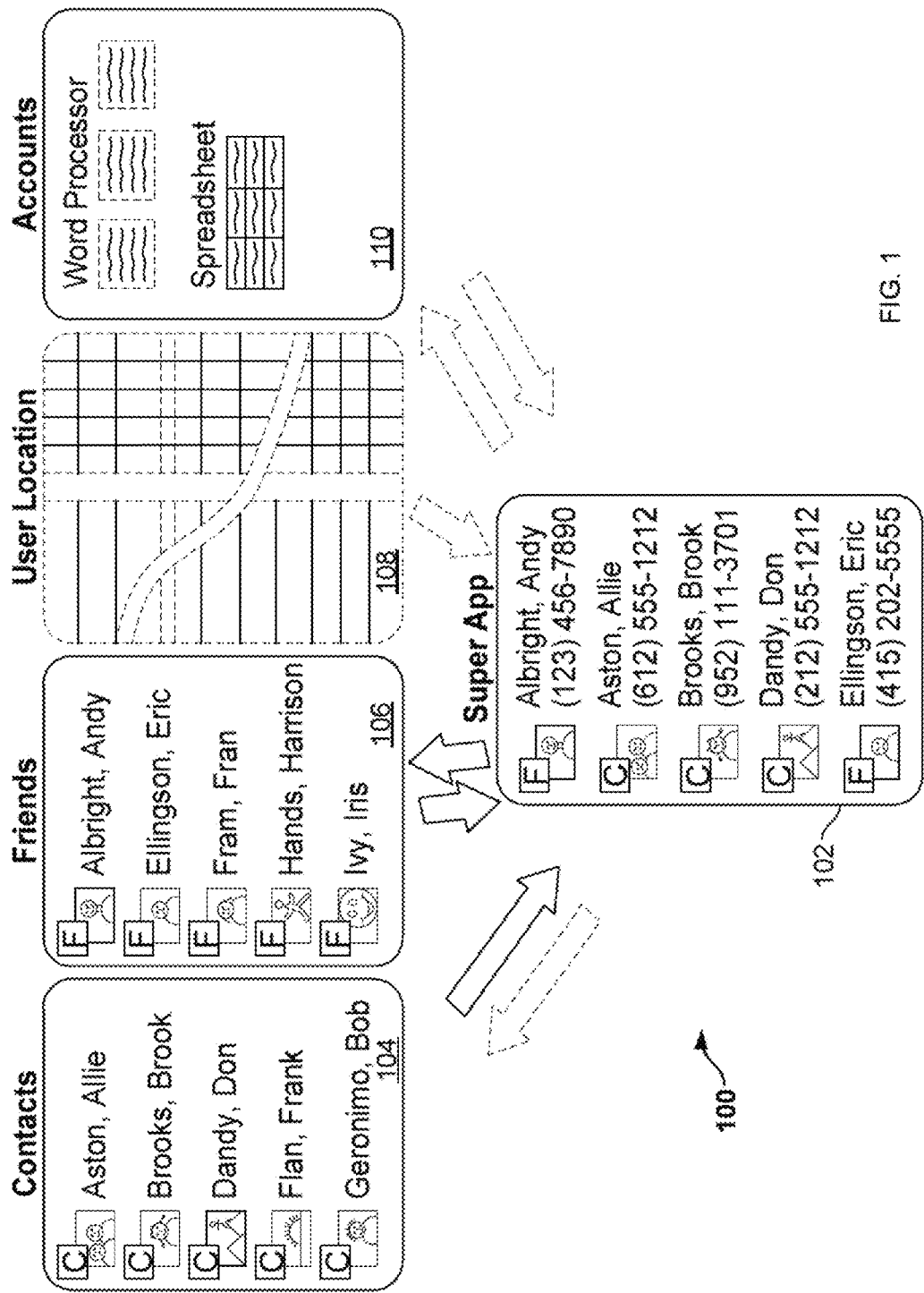
FIG. 1 is a conceptual diagram showing restricted access for a computer application that has been established using pre-permissioning techniques.

FIG. 1 is a conceptual diagram showing restricted access for a computer application that has been established using pre-permissioning techniques. In general, a computer application 102, named by its developer as Super App, is shown within a system 100 for providing information to various computer applications. The system 100 includes a number of resources 104-110 that may be made available to various applications to assist those applications in providing improved functionality to a user of a computing device on which the application 102 runs.

In this example, the application 102 acts to merge various contact information for a user in a single contacts list. For example, the contact information may be obtained both from a contacts service 104 and a friends service 106. The application 102 may provide information on various acquaintances of a user of a device and may permit the user to interact with the information about those acquaintances in a manner that is easier and more powerful than if the information were kept separate.

The contacts service 104 may be a hosted contacts list that is specific to the user and/or a contacts list stored locally on the user's device. Various mechanisms for maintaining and presenting contacts lists are well known in the art. However, while it may be nice for the user to have their contacts merged in this manner, the user has to cede some security over his or her data to effect such a merger. In particular, the user must give the merging application access to the merged data, via the services 104, 106. The techniques described here may provide the user with a relatively fine-tuned degree of control over such access. For example a solid arrow directed from service 104 to application 102, and a dashed arrow in the opposite direction indicate that the application 102 has access to read information from the contacts service 104, but does not have access to write information to the contacts service 104. It may be that, when the user installed the application 102, the user was concerned about data corruption and less concerned about privacy, so the user granted the application permissions only to read from the contacts service 104, and not to write to it. Such a decision by the user may have a negative effect on the usability of application 102, but that problem may be acceptable to the user in return for greater security.

Both arrows between the friends service 106 and the application 102 are solid, thus indicating that the application can both read from and write to the friends service 106. For example, the application 102 might display to the user posts that friends have left on their personalized pages, and may permit the user to respond to the posts. Because such information is semi-public (i.e., it is accessible to anyone who can see the friends' pages), the user may not have been as concerned about security, and thus may have granted access to such activities.

Two other services 108, 110 are shown in all dashed lines, thus indicating that the application 102 does not have access to those services. Such a result may occur where the application is not written to use such services, and thus does not request access to them, or where a user, when initially installing the application 102 on his or her computing device, or at a later time, indicates an intent to prevent the application from accessing such services.

Service 108 is a location finder for the user that passes information to other applications, as shown by an arrow flowing in a single direction. In this instance, the user may have decided that they did not want the application 102 to know their current location, so they may have indicated, when installing the application 102, that the application 102 could not have access to the service 108. In another instance, the access may have been provided but restricted, such as by having the application 102 use an API to the service 108 by which the service 108 will provide only approximate location information for the user. The location information may also be information that provides the approximate current location of other users, such as friends of the user in a social network system. In this instance, because the user has blocked information from the service 108, the application 102 is able only to show a merged contact list with contact information, but not to provide additional functionality of listing the current location of the user's friends or of the user. The application 102 is also unable to perform various other functions that might depend on the locations of users. Thus, in this manner, the user has selectively blocked access to certain of the services available to their device so as to increase their security, but has lost some, but not all, of the functionality of application 102. In other situations, a particular service may be core to an application, and the system 100 may refuse to let the user install the application 102 on their device if they will not agree to give the application 102 access to such a necessary service.

Service 110 provides access to various documents associated with the user. For example, the user may store a number of word processing and spreadsheet documents with a hosted system. The application 102 may provide a feature by which it can scan such documents for names and other contact information to be added to a merged contacts list. The application 102 may also, in appropriate circumstances, write information to such documents, such as by filling in missing contact information that the application can find by accessing on line information sources. As one example, a document may include a letter to a particular person (so the application 102 may read from the word processing document), and the application 102 may look up a telephone number for that person, and may add contact information for the person to one or more spreadsheets (so the application 102 may write to the spreadsheet).

In this example, the user has blocked all access by the application 112 to the accounts service 110, perhaps because the user has confidential information in the documents stores with their account. In other implementations, the blockage may be partial. For example, certain documents may be marked confidential or stored in a location that is marked confidential, and the application 102 may be denied access to those documents but granted access to other documents.

As explained in more detail below, the access provided of various services by the application 102 may be set when the application 102 is first installed on a user's device. For example, the application 102 may be downloaded from an application store, and the process of installing the application may lead to access or permission options being displayed to the user. In some instances, the permissions for an application will be identified by the developer of the application as non-negotiable, so that a user will need to accept the restrictions if the buyer wants to have access to the program.

In this manner, a user can make access decisions when they are first obtaining a program, and can thus change their mind about purchasing the program before completing the purchase transaction if the resources to which an application requests or demands access are too intrusive for the user. The user can also select, in certain circumstances, particular types of access for various different services, so that an application can operate for the user, though not in as complete a manner as it otherwise would if it had access to all possible services. Also, if the user deals with permissions issues when installing an application, they can avoid being constantly reminded of requests for access by the application.

Figure 2:
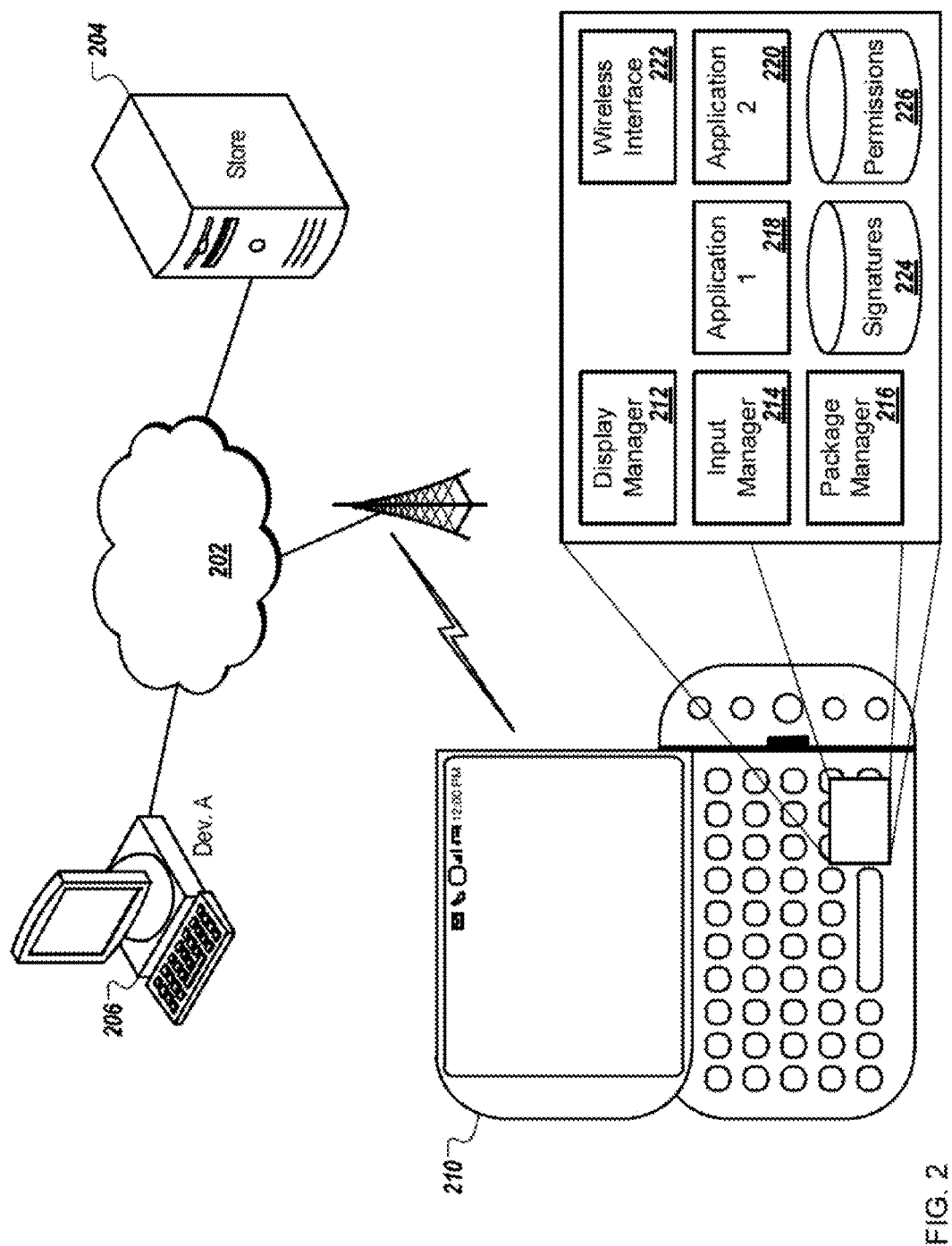
FIG. 2 is a schematic diagram of a system for controlling access to computer resources using permissions.

FIG. 2 is a schematic diagram of a system 200 for controlling access to computer resources using permissions. In general, the system provides mechanisms by which a developer of a software application may establish permissions that the application needs in order to operate properly. A user of the application may then, when installing and purchasing the application, select permissions that they want to grant to the application, from permissions that the developer has made optional in order to execute the application. If the user has selected no permissions, then the application cannot operate properly, and the transaction may be declined for the device. Once the application is installed, however, an operating system may control the access of various services or other resources by the application.

Using the system 200, for example, one or more developers may create applications that may depend on various services, and may identify which services must be reachable in order for the applications to operate, and which are only optional. The system 200 may include a plurality of application developers, application stores, and user devices, in communication with each other via a network 202 (e.g., a cell phone carrier network, the Internet, etc.). For example, the system 200 may include application developer 206 which may employ computer devices (e.g., workstations, servers, etc.) running various software application development environments (e.g., Eclipse, Ant, etc.) to generate compiled versions of software applications for distribution. The developer 206 may then upload the applications to an application store 204 where it can be reviewed and purchased by the general public. For example, the application store 204 may be a server (or a group of servers) for hosting and distributing applications provided by one or more application developers. The store 204 may be accessible online, for example, via a cell phone network, the Internet, or another wireless network. Application developers may submit compiled and signed versions of software applications to the application store 204. Submitted applications may be made available by the application store 204 to one or more user devices.

The system 200 may also include a user device 210. For example, the device 210 may be a smartphone, a personal digital assistant (PDA), a netbook, or other similar mobile computing device. A user of the device 210 may access the application store 204, for example, to browse, select, purchase, and download applications that have been submitted to the store by various application developers.

A number of components within device 210 may be configured to provide functionality related to obtaining applications from the application store 204, for example, and installing, storing, and running the applications once the applications have been obtained. One such component of the device 210 is a display manager 212, which may be responsible for rendering content for presentation on device 210 (e.g., on the device display screen). The display manager 212 may receive graphic-related content from a number of sources and may determine how the content is to be provided to a user. For example, a number of different windows for various device applications may need to be displayed, and the display manager 212 may determine which to display, which to hide, and what to display or hide when there is overlap between various graphical objects. The display manager 212, for example, can present to the device user an interface associated with the application store 204.

An input manager 214 may be responsible for translating commands provided by a user of device 210. For example, such commands may come from a keyboard, from a touch screen, from a trackball, or from other such sources, including dedicated buttons or soft buttons (e.g., buttons whose functions may change over time, and whose functions may be displayed on areas adjacent to the particular buttons). The input manager 214 may determine, for example, in what area of the device display commands are being received, and thus in what application being shown on the display the commands are intended for. In addition, it may interpret input motions on the touch screen into a common format and pass those interpreted motions (e.g., short press, long press, flicks, and straight-line drags) to the appropriate application. The input manager 214 may also report such inputs to an event manager (not shown) that in turn reports them to the appropriate modules or applications. The input manager 214, for example, can enable the user to interact with the interface that is associated with the application store 204. For example, interactions with the interface may be interpreted by the input manager 214, enabling the user to browse, select, and purchase applications from the store 204.

A wireless interface 222 manages communication with a wireless network, which may be a data network that also carries voice communications. The wireless interface 222 may provide for communication by the device 210 with messaging services such as text messaging, e-mail, and telephone voice mail messaging. In addition, the wireless interface 222 may support downloads and uploads of content and computer code over a wireless network such as a cell phone network or the Internet. For example, the wireless interface 222 can enable the user to download one or more applications (e.g., applications 218 and 220) from the application store 204. As another example, the wireless interface 222 can enable applications running on the device 210 to request and receive application services from a third-party provider (e.g., a friends service) over the network 202.

Applications 218, 220 may be installed, stored, and executed on the device 210. For example, the applications 218, 220 may take a variety of forms, such as commercial applications, custom applications, mapping applications, e-mail and other messaging applications, music and video players, and various applications running within a web browser or running extensions of a web browser. The applications 218, 220, for example, may include signatures provided by their creators (e.g., application developers 206, 208) from certificates that the creators have themselves signed. Also, the applications 218, 220, may depend, necessarily or optionally, on information received from other applications on the device 210, or from third party services located away form the device 210, such as various public web services.

A package manager 216 mediates access of device applications to functionality and data, using signatures 224 and permissions 226. For example, functionality provided by the device 210 operating system, or functionality provided by applications residing on the device, may be granted or denied by the package manager 216. As another example, access to data associated with device applications may be granted or denied by the package manager 216. If an application requests access to a functional or data service provided by the operating system or another application, for example, the package manager 216 may examine the signatures (generated by the certificates) of the requesting and providing applications, and grant the request (e.g., based on a match) or deny the request (e.g., based on a mismatch). For example, signatures 224 associated with one or more device applications (e.g., applications 218, 220) may be extracted from the applications by a package parser (not shown) working with the package manager 216. The signatures may be extracted and examined by the package manager 216, for example, upon installation, upon a functional request, or upon another event relevant to the granting or denial of application permissions.

Also, particular permissions 226 may be correlated to an application when it is installed and may be updated at a later time by a user of the device 210. The package manager may refer to such permissions when the application is requesting access to another application or service on the device 210, or to data maintained by another application or service.

To illustrate an example of the package manager 216 in use, application 218 may request to access user data 226 controlled by application 220. For example, the package manager 216 may use a package parser (not shown) to extract signatures 224 from certificates used to sign the requesting application 218 and the controlling application 220. If the package manager 216 determines a match, for example, permission to access user data 226 may be provisionally granted to the requesting application 218 by the manager service. The package manager 216 may then access the permissions 226 to determine whether the particular application should have access to the information that it seeks. In certain instances, a match of certificates or resulting signatures (where there may be a one-to-one correlation between the signature and the certificate so that a match of signatures indicates a match of certificates) may be enough to provide the requesting application with full access, particularly when the matching of certificates or resulting signatures indicates that two applications were written by the same developer. In other instances, a lack of match in certificates or resulting signatures can be overcome by the presence of one or more permissions for a particular information access. Also, different levels of security may be maintained, so that permissions without certificates or resulting signatures can be sufficient for low level information, but permissions and certificates or resulting signatures will be required for more confidential or sensitive information.

Figure 3A:
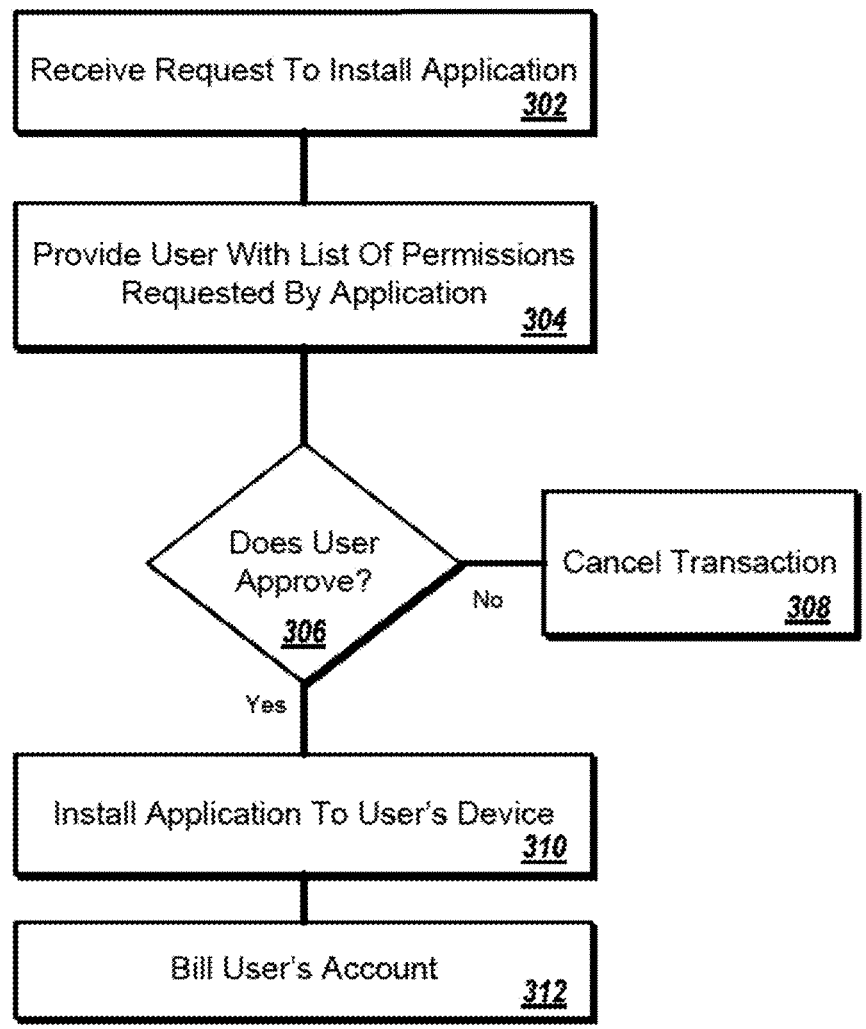
FIG. 3A is a flowchart of a process for pre-permissioning a computer application during downloading and installation of the application.

FIG. 3A is a flowchart of a process for pre-permissioning a computer application during downloading and installation of the application. In general, the process relates to actions that a user of a computing device may take when installing a new application on the device, in order to establish permissions for the application so that the user need not be bothered every time the application subsequently attempts to access such information. The actions shown here may be performed when an application is installed, and may be performed again if a user wishes to update the permissions that they provide to an application.

The process begins at box 302, where a computing device receives a request from a user to install an application. The request may come directly from the user or from an application store in response to a user selection to acquire an application. At box 304, the process provides the user with a list of permissions that are requested by the application. For example, the application may have a manifest of resources to which it needs access in order to operate properly. Such a list may be analyzed and may be displayed to a user so that the user will know the places that the application will be going to look for information.

At box 306, the user is given the opportunity to approve of the permissions that have previously been identified by the developer of the application. If the user approves, the application may be installed to the user's device or otherwise made available on the device (box 310), and the user's account may be billed in appropriate circumstances (box 312). If the user does not approve, the transaction is cancelled because the application cannot execute properly on the user's device without access to the various necessary services that have previously been identified by the developer.

Figure 3B:
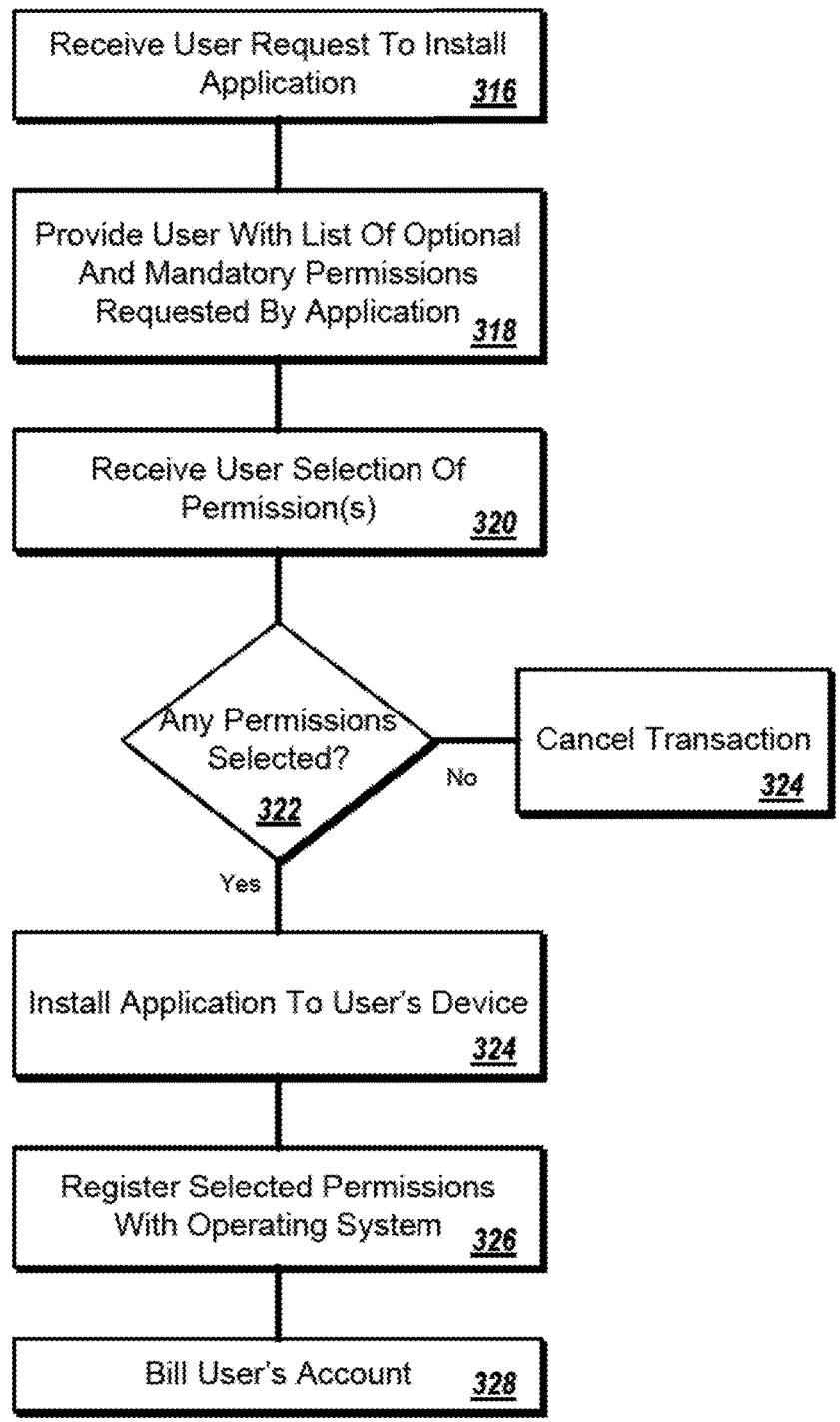
FIG. 3B is a flowchart of a process for pre-permissioning a computer application for selected permissions.

FIG. 3B is a flowchart of a process for pre-permissioning a computer application for selected permissions. The flowchart is similar to the flowchart in FIG. 3A, but shows additional detail by which a user can select a certain subset of permissions that a developer has identified as being the complete set of permissions that the developer's application might seek access to.

The process begins at box 316, where a computing device receives a user request to install an application. Again, the request may occur by the user selecting a desired application from an on line application store, so as to begin an installation process for the application. At box 318, the requesting user is provided with a list of optional and mandatory permissions that will be requested by the application. Mandatory permissions may cover things that the application needs in order to have even its most basic functionality. Optional permissions may include things that the application needs in order to run optimally, but that it can do without. The permissions may be determined automatically by scanning the code for the application, or manually by asking a developer to identify the relevant permissions that will be needed by the developer's application or applications. The permissions may also be generated by a hybrid process, where the initial permissions are determined automatically by performing an electronic analysis of the code, and then a developer may confirm where the automatic determination is accurate, and where it needs to be updated or corrected.

At box 320, the process receives user selections of the permissions. For example, the user may be given the option to set which permissions, of the optional permissions, will be allowed for the application once it is installed. Such selection may occur in a variety of manners. At box 322, the process determines if any permissions have been selected. If none have been selected, then the transaction is cancelled (box 324) because the application will not be able to run properly with no available permissions, where the developer has identified a number of permissions to which the application needs access.

If the user has selected at least a minimum number of permissions (e.g., those identified by the developer as mandatory), the application's installation on the user's computing device is completed (box 324). The permissions selected by the user may also be registered with the operating system of the device, which itself may have one or more components programmed to mediate access to system resources according to the permissions. The user's account may then be billed for the applications, box 328, in the situation where the developer has charged for the application.

Figure 3C:
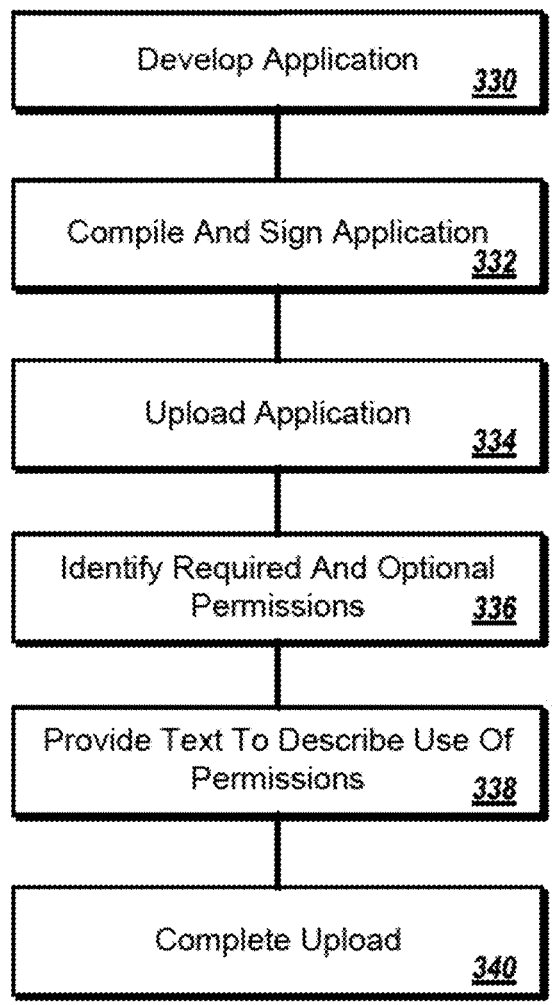
FIG. 3C is a flowchart of a process for posting a computer application having predetermined permissions.

FIG. 3C is a flowchart of a process for posting a computer application having predetermined permissions. In general, the process may be followed by a developer of an application in order to identify the permissions needed by the application, in order for the application to operate properly. The assignment of permissions to an application may occur automatically, and may also include input from the developer so that the developer may maintain control over the quality of the developer's applications by refusing to allow the applications to be sold unless a certain minimal amount of functionality (which is tied to permissions that are made available to the application).

The process starts at box 330, where a software author develops an application. At box 332, the developer compiles and signs the application using a digital certificate. The generation of the certificate may happen by the developer itself rather than from a certification authority. In this manner, a certificate may be generated easily, and may at least establish a certified level of trust between two applications that are authored by the same developer. At box 334, with the application compiled and signed, the developer uploads the application. The process of uploading may cause an application store to analyze the code being uploaded to determine various permissions that may be sought by the application. The application store may thus list all such identified permissions and may give the developer the opportunity to identify particular permissions as being mandatory to the operation of the application or optional to the operation of the application (box 336). Where a permission is identified as being optional, the developer may provide a textual description of the manner in which the permission is to be used by the application. In this manner, when a user acts to install the application, they can quickly see, in the words of the developer, what they will be missing if they do not approve one of the optional permissions. Finally, at box 340, the uploading of the application is completed.

FIG. 4A is a screen shot of a display for receiving permissioning information for an uploaded computer application. In general, the screen shot shows an interface that may be used to carry out at least part of the process described with respect to FIG. 3C. In particular, the screen shot shows that a developer has begun to upload an application by providing a name for the application. The interface is then querying the developer to identify, from a list of six permissions, those permissions that are mandatory to, or optional to, the operation of the application. Where the developer has identified an optional permission, the developer has been given the opportunity to identify what the permission provides to the application, and thus what a user will miss if they do not grant the permission.

Figure 4C:
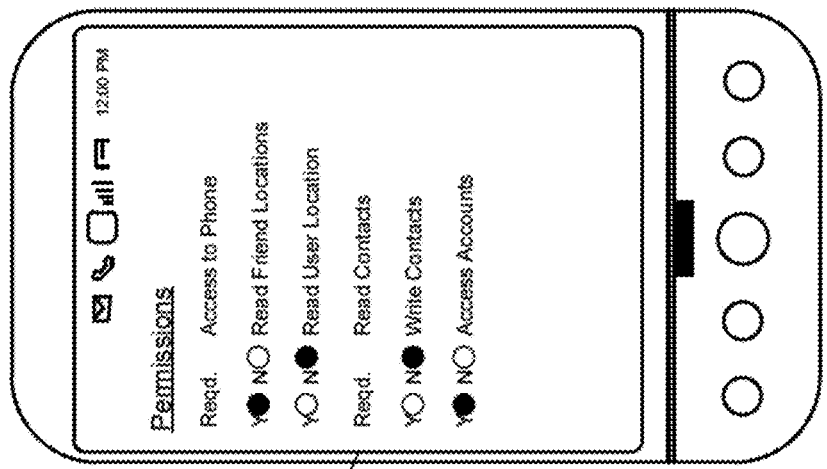
FIG. 4C is a screen shot of a mobile device display that lets a user identify particular permissions for an application to be downloaded and installed for the user.
Figure 4B:
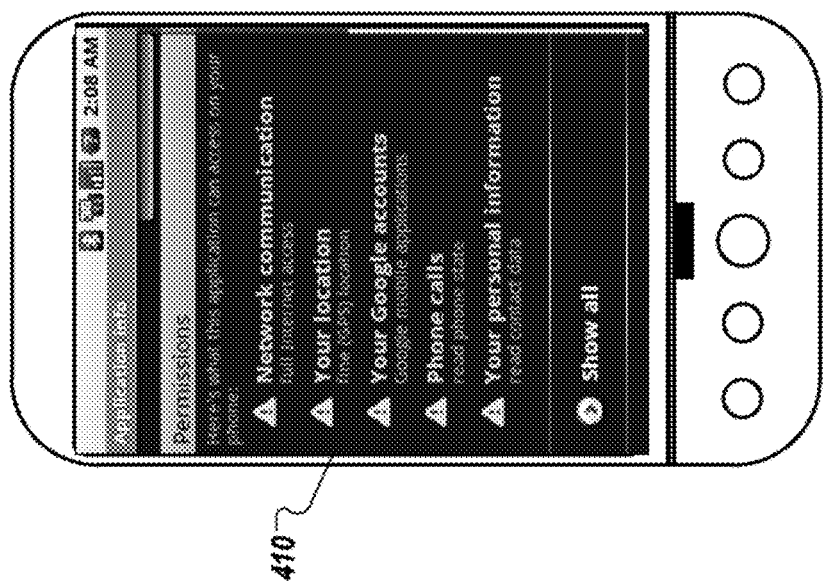
FIG. 4B is a screen shot of a mobile device display notifying a user of permissions required by an application.

FIG. 4B is a screen shot of a mobile device display notifying a user of permissions required by an application. In general, the screen shot 410 shows what a smart phone device might show with respect to permissions before or after the device has installed an application from an on line application store.

FIG. 4C is a screen shot of a mobile device display that lets a user identify particular permissions for an application to be downloaded and installed for the user. This screen shot 412 is similar to the screen shot 410 in FIG. 4A, but the user has been provided with an opportunity to fine tune the permissions that will be available to a computer application.

Figure 5:
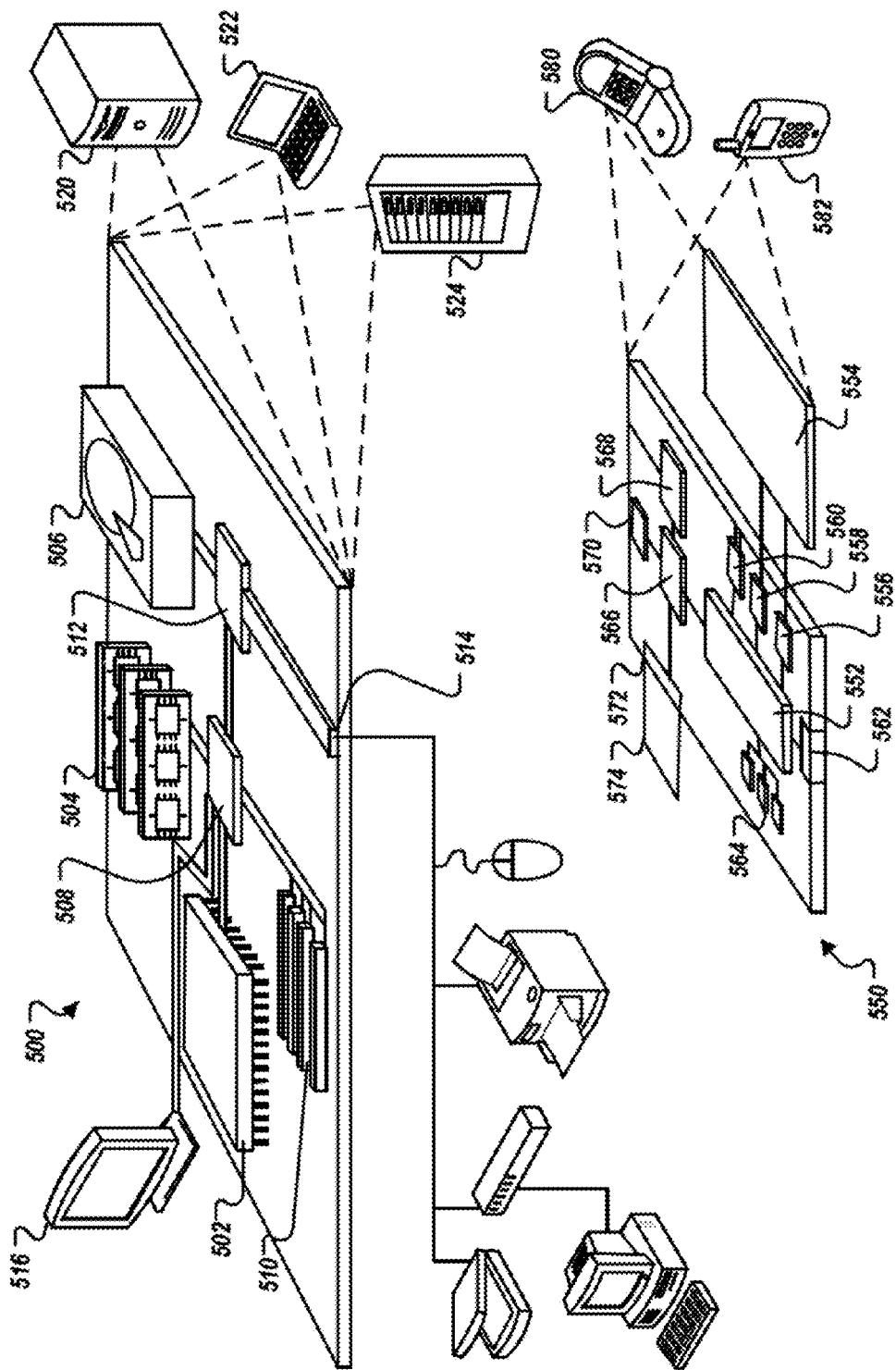
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interface may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer-implemented method of pre-permissioning an application, the method comprising:
    receiving a request from a user to install an application;
    in response to receiving the request from the user, transmitting to an application marketplace a request associated with obtaining a copy of the application, and receiving in response information that indicates a list of computing services that are needed to properly execute the application;
    presenting to the user for review and before downloading the application, one or more of the computing services indicated by the received list of computing services;
    determining, after presenting the one or more computing services and before downloading the application, that the user approves enablement of the presented one or more computing services and installation of the application;
    causing the application to be downloaded and installed for execution on a computing device assigned to the user in response to determining that the user has approved enablement of the presented one or more computing services for the application to use when the application is executed; and
    causing, by a computing system, an account assigned to the user to be billed in response to determining that the user has approved enablement of the presented one or more computing services for the application to use when the application is executed,
    wherein the computing system is configured to not bill the account assigned to the user in response to determining that the user does not approve enablement of the presented one or more computing services.

2. The method of claim 1, wherein receiving the request from the user to install the application comprises receiving a user request directed to an on-line application store, and wherein the application is downloaded from the on-line application store.

3. The method of claim 1, wherein a first of the one or more computing services comprises writing to a particular data set, and a second of the one or more computing services comprises reading from the particular data set.

4. The method of claim 3, wherein writing to the particular data set is an optional computing service that need not be available to the user in order to operate the application.

5. The method of claim 1, further comprising executing the application and blocking access to at least one of the computing services, while allowing access to at least one of the other computing services.

6. The method of claim 5, wherein the at least one of the computing services to which access is blocked includes a computing service that the user selected to be inaccessible to the application at the time of installing the application.

7. The method of claim 6, further comprising prompting the user, at the time of executing the application, to determine whether the user would like to access the at least one computing service.

8. A non-transitory computer-readable medium including instructions that, when executed by one or more processors, cause performance of operations that include:
receiving a request from a user to install an application;
in response to receiving the request from the user, transmitting to an application marketplace a request associated with obtaining a copy of the application, and receiving in response information that indicates a list of computing services that are needed to properly execute the application;
presenting to the user for review and before downloading the application, one or more of the computing services indicated by the received list of computing services;
determining, after presenting the one or more computing services and before downloading the application, that the user approves enablement of the presented one or more computing services and installation of the application;
causing the application to be downloaded and installed for execution on a computing device assigned to the user in response to determining that the user has approved enablement of the presented one or more computing services for the application to use when the application is executed; and
causing, by a computing system, an account assigned to the user to be billed in response to determining that the user has approved enablement of the presented one or more computing services for the application to use when the application is executed,
wherein the computing system is configured to not bill the account assigned to the user in response to determining that the user does not approve enablement of the presented one or more computing services.

9. The non-transitory computer-readable medium of claim 8, wherein receiving the request from the user to install the application comprises receiving a user request directed to an on-line application store, and wherein the application is downloaded from the on-line application store.

10. The non-transitory computer-readable medium of claim 8, wherein a first of the one or more computing services comprises writing to a particular data set, and a second of the one or more computing services comprises reading from the particular data set.

11. The non-transitory computer-readable medium of claim 10, wherein writing to the particular data set is an optional computing service that need not be available to the user in order to operate the application.

12. The non-transitory computer-readable medium of claim 8, wherein the operations include executing the application and blocking access to at least one of the computing services, while allowing access to at least one of the other computing services.

13. The non-transitory computer-readable medium of claim 12, wherein the at least one of the computing services to which access is blocked includes a computing service that the user selected to be inaccessible to the application at the time of installing the application.

14. The non-transitory computer-readable medium of claim 13, wherein the operations include prompting the user, at the time of executing the application, to determine whether the user would like to access the at least one computing service.

* * * * *